March 7, 1950　　　　　L. E. HUNT　　　　　2,499,755
FREQUENCY MEASURING SYSTEM
Filed May 9, 1947
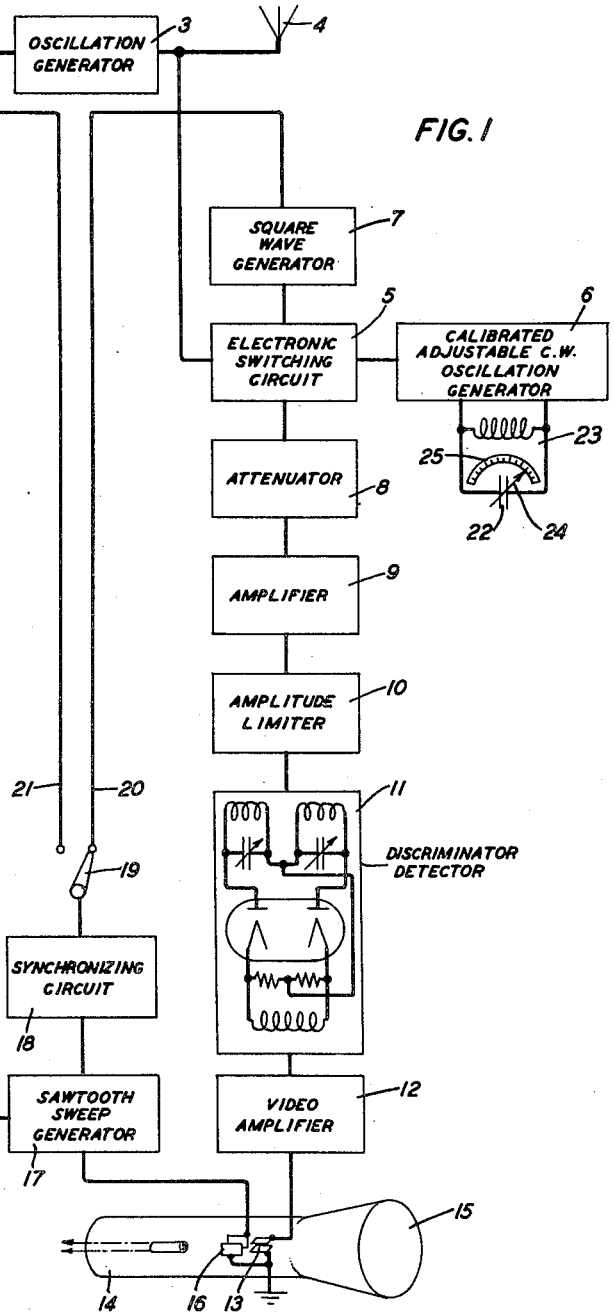
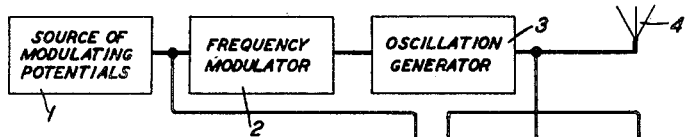
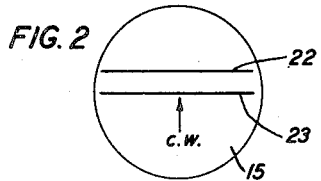
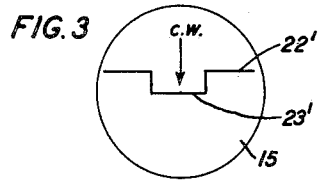
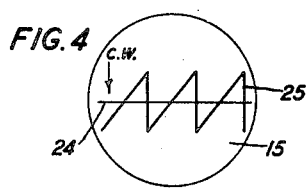
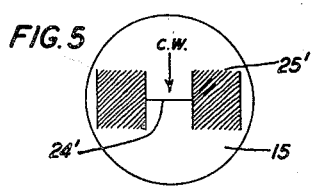
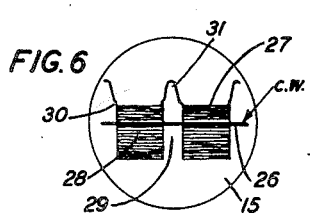
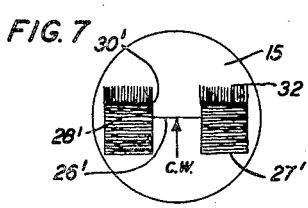
INVENTOR
L. E. HUNT
BY
G. H. Stevenson
ATTORNEY Patented Mar. 7, 1950

2,499,755

UNITED STATES PATENT OFFICE 2,499,755

FREQUENCY MEASURING SYSTEM

Loyd E. Hunt, Oakhurst, N. J., assignor to Bell Telephone Laboratories, Incorporated, New York, N. Y., a corporation of New York Application May 9, 1947, Serial No. 746,946

8 Claims. (Cl. 332—20)

This invention relates to frequency measuring circuits and, more particularly, to an improved measuring circuit for measuring or indicating the frequency deviations of a frequency modulated electric wave.

When an electric carrier wave has its frequency modulated by an electric signal wave, the frequency of the carrier wave is caused to vary above and below a relatively constant median frequency by an amount dependent upon the amplitude of the modulating signal wave. A knowledge of the amount of these frequency deviations of the carrier wave is essential for the proper adjustment and operation of a frequency modulation transmission system.

Accordingly, it is an object of this invention to provide an improved measuring circuit for measuring or indicating frequency deviations of a carrier wave from an assigned frequency in a frequency modulation transmission system.

Another object is to provide an improved measuring circuit for measuring the instantaneous frequency of a frequency modulated wave.

A further object is to provide an improved measuring circuit for exploring the transmission wave band of a frequency modulation transmission system.

An additional object is to provide an improved monitoring circuit for monitoring a frequency modulation communication system.

Still another object is to provide an improved circuit for comparing a frequency modulated wave with a continuous wave.

These and other objects of the invention are accomplished through the use of the substitution method of comparison which involves intermittently substituting a continuous wave of known frequency for a frequency modulated wave of unknown frequency. The two waves to be compared are applied alternately by a gating device, such as an electronic switching circuit, to a frequency discriminator type of detector which, in a preferred embodiment of the invention, is the balanced type of frequency modulation detector. The output voltages of the discriminator are proportional to the deviations of the frequency of the applied waves from a reference frequency constituted by the center frequency of the crossed slope circuits in the balanced discriminator. The output voltages from the discriminator are applied to the vertical deflecting plates of a cathode ray oscilloscope. A sweep voltage, synchronized with either the modulating potentials or the switching potentials, is applied to the horizontal deflecting plates. The oscilloscope thus produces alternately an image representing the deviations of the frequency modulated wave from the mean operating frequency of the discriminator and a straight line image representing the difference between the frequency of the continuous wave and the mean operating frequency of the discriminator. Due to persistence of vision, the two images either appear side by side if the sweep voltage is synchronized with the switching potentials or appear superimposed if the sweep voltage is synchronized with the modulating potentials. The frequency value of any point on the image of the frequency modulated wave may be measured by changing the frequency of the continuous wave until its straight line image crosses the image of the frequency modulated wave at the desired point.

These and other features of the invention are more fully described in connection with the following detailed description of the drawing in which:

Fig. 1 is a schematic diagram of the improved measuring circuit;

Fig. 2 shows the wave patterns which appear on the screen of the cathode ray oscilloscope when the deviation image of an unmodulated wave of unknown frequency is compared with the deviation image of a continuous wave of known frequency;

Fig. 3 illustrates the image patterns produced on the oscilloscope screen by the two waves of Fig. 2 when the rate of the saw-tooth sweep voltage is synchronized with the rate of the switching potentials;

Fig. 4 represents the appearance of the screen when the image of the deviations of a saw-tooth frequency modulated wave and the deviation image of a continuous wave are produced while the sweep voltage is synchronized with the modulating potentials;

Fig. 5 shows the image patterns produced on the screen by the two waves of Fig. 4 when the sweep voltage is synchronized with the switching potentials;

Fig. 6 shows the deviation image of a continuous wave superimposed on the deviation image of a television signal due to the sweep voltage being synchronized with the modulating potentials; and Fig. 7 illustrates the image patterns produced on the screen by the two waves of Fig. 6 when the sweep voltage is synchronized with the switching potentials.

In Fig. 1, a frequency modulation transmitting system is shown to include a source I of modulating potentials connected to a frequency modulator 2 which, in turn, is connected to an oscillation generator 3 for supplying a load circuit represented by an antenna 4. These elements may comprise any suitable apparatus known to those skilled in the art. During the operation of the system, the frequency modulator 2 causes the frequency of the oscillations generated by the oscillation generator 3 to be varied over a frequency band at a rate and to a degree determined by the frequency and amplitude of the modulating potentials from the source 1 in a manner well known in the art.

A portion of the modulated output of the oscillation generator 3 is supplied to an electronic switching circuit 5 which is also supplied with electric waves of known frequency produced by a calibrated adjustable continuous wave oscillation generator 6. The frequency of the continuous waves produced by the oscillation generator 6 can be varied or adjusted by any suitable means known to those skilled in the art, such as by manually varying the capacitance of a variable condenser 22 in its frequency determining circuit 23. The movable element of the condenser 22 should be provided with an indicator 24 movable over a scale 25 calibrated in terms of the oscillator frequency. The electronc switching circuit 5 operates under the control of periodic switching potentials supplied to it by a square wave generator 7 and applies alternately the frequency modulated waves from the oscillation generator 3 and the continuous wave of known frequency from the calibrated oscillation generator 6 to an attenuator 8. The output of the attenuator 8 is connected to an amplifier 9 which is designed to operate in the frequency range of the oscillation generator 3 and which has its output connected to an amplitude limiter 10. After passing through the amplitude limiter 10, the waves are supplied to a frequency discriminator type of detector 11 which has its output connected to a video amplifier 12. After the rectified waves have been amplified by the video amplifier 12, they are applied to the vertical deflecting plates 13 of a cathode ray oscilloscope 14.

The square wave generator 7 may be of any suitable design, such as that disclosed in Patent 2,132,655 granted October 11, 1938, to J. P. Smith. The disclosure of this Smith patent is incorporated herein by reference as a part of this specification. The electronic switching circuit 5 may also be of any suitable design, such as that disclosed in Patent 2,221,115 granted November 12, 1940, to F. H. Shepard, Jr. The disclosure of this Shepard patent is incorporated herein by reference as a part of this specification. The use of an electronic switching circuit controlled by square waves for alternately supplying electric waves from two different sources to the deflecting plates of a cathode ray oscilloscope is known in the art and is disclosed, for example, in Fig. 126 on page 167 of "Cathode-Ray Oscillographs" by J. H. Reyner. The calibrated oscillation generator 6, the attenuator 8, the intermediate frequency amplifier 9, the amplitude limiter 10, the discriminator 11, the video amplifier 12, and the cathode ray oscilloscope 14 may each be of any suitable type well known to those skilled in the art. Although the discriminator-detector 11 is shown in the drawing to be of the balanced type, it is to be understood that this represents a preferred embodiment of the invention and that any other suitable type of frequency modulation detector may be used if desired. The attenuator 8 and the amplifier 9 constitute refinements of the system and are not basic to the operation of the system. The use of an amplitude limiter is not essential to the functioning of this measuring circuit but is desirable as it prevents differences in level from affecting adversely the operation of the discriminator 11. The slope circuits in the discriminator are so adjusted that their center frequency will be the preassigned reference frequency upon which the deviation measurements are to be based.

The horizontal deflecting plates 16 of the cathode ray oscilloscope 14 are supplied with a periodic saw-tooth sweep voltage produced by a saw-tooth sweep generator 17 of conventional design. The operation of the sweep generator 17 is controlled by a synchronizing circuit 18 also of conventional design. The rate of the saw-tooth sweep voltage produced by the sweep generator 17 can be synchronized with either the rate of the periodic switching potentials from the generator 7 or the modulating potentials from the source 1 by manually operating a switch 19 which connects the input of the synchronizing circuit 18 with either conductor 20 leading to the generator 7 or conductor 21 leading to the source 1.

During the operation of this monitoring or measuring circuit, the frequency modulated waves from the oscillation generator 3 and the continuous wave from the oscillation generator 6 are applied alternately by the electronic switching circuit 5 through the attenuator 8, amplifier 9, and limiter 10 to the discriminator-rectifier 11. As was stated above, the output voltages of the discriminator 11 are proportional to the deviations of the frequency of the applied waves from a reference frequency constituted by the center frequency of the adjustable crossed slope circuits in the frequency discriminator 11. These output voltages from the discriminator are amplified in the video amplifier 12 and are applied to the vertical deflecting plates 13 of the cathode ray oscilloscope 14. At the same time, the sweep voltages from the sweep generator 17 are applied to the horizontal deflecting plates 16. As is well known in the art, these voltages will produce mutually perpendicular deflections of the cathode beam of the oscilloscope 14.

Thus, the luminescent screen 15 of the oscilloscope 14 will present alternately an image pattern representing the deviations of the frequency modulated wave from the center frequency of the slope circuits in the frequency modulation detector 11 and an image representing the deviation of the continuous wave from the same center frequency. Due to the nature of the continuous wave, its image pattern will always be in the form of a straight line. These image patterns are alternately traced on the screen 15 so rapidly as to give effect to persistence of vision phenomenon. If the rate of the saw-tooth sweep voltage is synchronized with the rate of the periodic switching potentials produced by the generator 7, due to the switch 19 being moved into engagement with the conductor 20, then the two images will seem to appear side by side on the screen 15. On the other hand, if the sweep voltage is synchronized with the modulating potentials from the source 1, due to the switch 19 being moved into engagement with the conductor 21, then the two images will seem to appear superimposed upon the screen 15.

The instantaneous frequency value of any point on the deviation image of the waves from the oscillation generator 3 may be measured by adjusting the frequency of the waves produced by the calibrated oscillation generator 6 until its straight line image crosses the image of the waves from the oscillation generator 3 at the desired point. This can be best understood by considering first the case where the source 1 produces no output. Then the output of the oscillation generator 3 will be unmodulated and of constant frequency. With the switch 19 moved into engagement with the conductor 21, which in this case has no potential applied to it, the waves from the oscillation generator 3 which are now of constant frequency, will produce a straight line image on the oscilloscope screen 15 as represented by the line 22 in Fig. 2. Now, by adjusting the frequency of the waves produced by the calibrated oscillation generator 6 in the manner described above, the straight line image 23 of the continuous wave from the oscillation generator 6 can be brought into coincidence with the image 22. When the image 23 is thus superimposed upon the image 22, the value of the frequency to which the calibrated oscillation generator 6 has been adjusted will be the same as that of the waves produced by the oscillation generator 3.

If desired, the same result can be obtained by moving the switch 19 into engagement with the conductor 20 to synchronize the rate of the saw-tooth sweep voltage with the rate of the periodic switching potentials from the square wave generator 7. Then the image 22' of the unmodulated waves from the oscillation generator 3 and the image 23' of the continuous wave from the oscillation generator 6 will seem to appear side by side on the screen 15 as is illustrated in Fig. 3. By adjusting the frequency of the continuous wave produced by the oscillation generator 6, as was described above, the image 23' can be moved up on the screen 15 and brought into alignment with the image 22'.

When the waves produced by the oscillation generator 3 have their frequency modulated by saw-tooth modulating potentials supplied from the source 1, the screen 15 will appear as is shown in Fig. 4 if the switch 19 is moved into engagement with the conductor 21 to synchronize the sweep voltage with the modulating potentials from the source 1. The image of the continuous waves from the oscillation generator 6 will appear as the straight line 24 and the image representing the deviations of the frequency modulated waves from the center frequency of the slope circuits in the discriminator 11 will appear as the saw-tooth wave 25. Maximum and minimum frequency values of the saw-tooth image 25 can be obtained by adjusting the value of the frequency of the continuous wave produced by the oscillation generator 6 either upward or downward to bring the straight line image 24 into coincidence with either the peaks or the troughs of the saw-tooth image 25. Similarly, the instantaneous frequency value of any point on the saw-tooth image 25 can be determined by adjusting the frequency of the continuous wave produced by the calibrated oscillation generator 6 until its straight line image 24 crosses the saw-tooth image 25 at the desired point as was described above. If only the extremes of frequency deviation are to be measured, synchronization is not necessary, but, if the intermediate details of the image patterns are to be measured, then synchronization of the rate of the saw-tooth sweep voltage is of material assistance.

If the switch 19 is moved into engagement with the conductor 20 to synchronize the rate of the sweep voltage with the rate of the switching potentials produced by the square wave generator 7, then the screen 15 will have the appearance shown in Fig. 5. In Fig. 5 the image of the continuous wave from the oscillation generator 6 is represented by the straight line 24' and the image representing the deviations of the frequency modulated waves from the center frequency of the slope circuits in the discriminator 11 is a smear of light represented by the series of diagonal lines indicated at 25'. The same adjustments of the position of the straight line image 24' that were described above may also be performed in this instance.

In the event that the waves produced by the oscillation generator 3 are modulated with television signals supplied from the source 1, and with the switch 19 in engagement with the conductor 21 to synchronize the sweep voltage with the modulating potentials from the source 1, the oscilloscope screen 15 will present the appearance illustrated in Fig. 6. In Fig. 6, the image of the continuous wave from the oscillation generator 6 is represented by the straight line 26 and the image pattern of the deviations of the frequency modulated television signals from the center frequency of the slope circuits in the discriminator 11 is indicated by the reference numeral 27. The image pattern 27 while in the main constituting a smear of light represented by the horizontal lines 28 possesses certain identifiable features, such as the blanking pulse 29, the black level 30, and the synchronizing pulse 31. The frequency values of these features may be obtained by causing the straight line image 26 to be brought into coincidence or superimposed upon the various elements of the television signal image 27 in the same manner as that described above.

If the switch 19 is moved into engagement with the conductor 20 to synchronize the rate of the sweep voltage with the rate of the switching potentials supplied by the square wave generator 7, the oscilloscope screen will have an appearance similar to that shown in Fig. 7. In Fig. 7, the image of the continuous wave from the oscillation generator 6 is represented by the straight line 26' and the image pattern of the deviations of the frequency modulated television signals from the center frequency of the slope circuits in the discriminator 11 is indicated by the reference numeral 27'. While most of the image pattern 27' constitutes a smear of light represented by the horizontal lines 28', certain constantly recurring details, such as the black level 30' and the synchronizing peaks 32, can be recognized. Frequency measurements of such details can be obtained by causing the straight line image 26' to be moved up and down in the manner described above, the frequency value of any point on the wave pattern 27' being equal to that of the continuous wave when its straight line image 26' is brought into coincidence therewith.

What is claimed is:

1. A frequency comparison system comprising a source of waves of known frequency, a source of waves to be compared, a frequency discriminator-rectifier for producing from an impressed wave output voltages proportional to the difference between the frequency of the impressed wave and a reference frequency, periodic switching means for periodically impressing upon said frequency discriminator-rectifier waves from said sources alternately, a source of periodic switching potentials for controlling the switching operations of said switching means, a source of modulating potentials for modulating the frequency of the waves to be compared, a cathode ray oscilloscope, a source of periodic sweep voltage, synchronizing means for synchronizing said periodic sweep voltage with the potentials from one of said sources of potentials, and circuit means for applying the synchronized sweep voltage and the output voltages from said frequency discriminator-rectifier to said cathode ray oscilloscope to produce mutually perpendicular deflections of the cathode beam.

2. A frequency comparison system for comparing the frequencies of two waves, said system comprising a cathode ray oscilloscope, a source of periodic sweep voltage, a frequency modulation detector for producing from an impressed wave an output voltage proportional to the difference between the frequency of the impressed wave and a reference frequency, circuit means for applying the outputs from said sweep voltage source and said frequency modulation detector to said cathode ray oscilloscope to produce mutually perpendicular deflections of the cathode beam, a source of waves of known frequency, a source of waves to be compared, and periodic switching means operating synchronously with the rate of said sweep voltage for periodically connecting said source of waves of known frequency and said source of waves to be compared alternately to said frequency modulation detector for producing separate image patterns on the screen of said oscilloscope having deflections corresponding respectively to the frequencies of said waves.

3. A frequency measuring system comprising a cathode ray oscilloscope, a source of periodic sweep voltage, a detector having frequency discriminator means for producing from an impressed wave of voltage proportional to the difference between the frequency of the impressed wave and a reference frequency, circuit means for applying the outputs from said sweep voltage source and said discriminator-detector to said cathode ray oscilloscope to produce mutually perpendicular deflections of the cathode beam, a source of waves of known frequency, a source of waves to be measured, periodic switching means operating synchronously with said periodic sweep voltage for periodically connecting said source of waves of known frequency and said source of waves to be measured alternately to said discriminator-detector for producing separate juxtaposed image patterns on the screen of said oscilloscope having deflections corresponding respectively to the frequencies of said waves, and means for adjusting the frequency of the waves of known frequency to bring said image patterns into concidence.

4. A system for measuring the instantaneous frequency of a frequency modulated wave comprising a cathode ray oscilloscope, a source of periodic sweep voltage, a frequency modulation detector having frequency discriminator means for producing from an impressed wave a voltage proportional to the difference between the frequency of the impressed wave and a reference frequency, circuit means for applying the outputs from said sweep voltage source and said frequency modulation detector to said cathode ray oscilloscope to produce mutually perpendicular deflections of the cathode beam, a source of waves of known frequency, a source of waves to be measured, a source of modulating potentials for modulating the frequency of the waves to be measured, synchronizing means for synchronizing said periodic sweep voltage with said modulating potentials, switching means for periodically applying said waves of known frequency and said frequency modulated waves alternately to said frequency modulation detector for producing separate superimposed image patterns on the screen of said oscilloscope having deflections corresponding respectively to the frequencies of said applied waves, and means for adjusting the frequency of the waves of known frequency to bring said image patterns into coincidence at a desired point.

5. A frequency comparison system for comparing the frequencies of two waves, said system comprising a source of frequency modulated waves, a source of continuous waves of known frequency, a frequency selective network, a frequency variation detector for producing a direct current output voltage that is proportional to the difference between the instantaneous frequency of an impressed wave and a fixed reference frequency value determined by said frequency selective network, periodic switching means for impressing said frequency modulated waves alternately with said continuous waves upon the input to said frequency variation detector for causing it to produce output voltages which are alternately proportional in the same degree to the difference between the frequency of said modulated waves and the reference frequency fixed by said frequency selective network and to the difference between the frequency of said waves of known frequency and the same fixed reference frequency, a cathode ray tube having a luminescent screen adapted to be scanned by a beam of electrons, beam deflecting means for varying the position of the projection of said beam upon said screen, means for applying said output voltages from said detector to said beam deflecting means for causing the beam to trace periodically upon said screen an image pattern corresponding to the frequency of said continuous waves alternately with an image pattern representing the frequency variations of said frequency modulated waves, and tuning means for adjusting the frequency of said continuous waves.

6. A frequency comparison system for comparing the frequencies of two waves, said system comprising a source of frequency modulated waves, a source of continuous waves of known frequency, a frequency selective network, a frequency variation detector for producing a direct current output voltage that is proportional to the difference between the instantaneous frequency of an impressed wave and a fixed reference frequency value determined by said frequency selective network, periodic switching means for impressing said frequency modulated waves alternately with said continuous waves upon the input to said frequency variation detector for causing it to produce output voltages which are alternately proportional in the same degree to the difference between the frequency of said modulated waves and the reference frequency fixed by said frequency selective network and to the difference between the frequency of said waves of known frequency and the same fixed reference frequency, a source of periodic switching potentials for controlling the switching operations of said switching means, a cathode ray tube having a luminescent screen adapted to be scanned by a beam of electrons, beam deflecting means for varying the position of the projection of said beam upon said screen, a source of periodic sweep voltage, means for applying said sweep voltage to said beam deflecting means for partially controlling the deflections of said beam, means for applying said output voltages from said detector to said beam deflecting means for causing the beam to trace periodically upon said screen an image pattern corresponding to the frequency of said continuous waves alternately with an image pattern representing the frequency variations of said frequency modulated waves, synchronizing means for synchronizing the rate of said periodic sweep voltage with the rate of said periodic switching potentials for causing said image patterns to appear side by side on said screen, and control means for varying the point at which said image patterns appear side by side, said control means including tuning means for changing the frequency of said continuous waves.

7. A frequency comparison system for comparing the frequencies of two waves, said system comprising generating means for generating oscillations, a source of modulating potentials, modulating means for modulating the frequency of said oscillations to produce frequency modulated waves, a source of continuous waves of known frequency, a frequency selective network adjusted to select a predetermined frequency as a fixed reference value, a frequency variation detector, periodic switching means for applying said frequency modulated waves alternately with said continuous waves to the input of said frequency variation detector, said detector being adapted to produce direct current output voltages which are proportional to the frequency difference between the instantaneous frequency of an impressed wave and the fixed reference frequency determined by said frequency selective network, a cathode ray tube having a beam of electrons and a luminescent screen adapted to be scanned by said beam, beam deflecting means for varying the position of the projection of said beam upon said screen, a source of periodic sweep voltage, means for applying said sweep voltage to said beam deflecting means for partially controlling the deflections of said beam, means for applying said output voltages from said detector to said beam deflecting means for causing the beam to trace periodically upon said screen an image pattern representing the frequency variations of said frequency modulated waves alternately with an image pattern corresponding to the frequency of said continuous waves, synchronizing means for synchronizing said periodic sweep voltage with said modulating potentials for causing said image patterns to appear superimposed one over the other on said screen, and control means for varying the point at which the continuous wave image pattern is superimposed upon the frequency modulated wave image pattern, said control means comprising tuning means for varying the frequency of said continuous waves.

8. A measuring system for measuring the instantaneous frequency of a frequency modulated wave, said system comprising a source of frequency modulated waves, a source of continuous waves of known frequency, a frequency variation detector having a frequency selective network comprising a pair of crossed slope circuits adjusted to have a center operating frequency at a fixed value, periodic switching means for applying said frequency modulated waves alternately with said continuous waves to said frequency variation detector for causing it to produce output voltages which are alternately proportional in the same degree to the difference between said frequency modulated waves and said center operating frequency and to the difference between the frequency of said continuous waves and said center operating frequency, a cathode ray tube having a beam of electrons adapted to impinge upon a luminescent screen and beam deflecting means for varying the position of the point of impingement of said beam upon said screen, means for applying said output voltages from said dectector to said beam deflecting means for causing the beam to trace periodically upon said screen an image pattern determined by the frequency difference between said frequency modulated waves and said center operating frequency alternately with an image pattern determined by the frequency difference between the frequency of said continuous waves and said center operating frequency, and control means for bringing the continuous wave image pattern into coincidence with any point on the frequency modulated wave image pattern for determining the instantaneous frequency value represented by said point, said control means comprising tuning means for varying the frequency of said continuous waves of known frequency to change the frequency difference between the frequency of said continuous waves and the center operating frequency.

LOYD E. HUNT.

REFERENCES CITED

The following references are of record in the file of this patent:

UNITED STATES PATENTS

| Number | Name | Date |
| --- | --- | --- |
| 2,272,768 | Crosby | Feb. 10, 1946 |
| 2,419,527 | Bartelink | Apr. 29, 1947 |